US008234298B2

(12) United States Patent
Winter et al.

(10) Patent No.: US 8,234,298 B2
(45) Date of Patent: Jul. 31, 2012

(54) SYSTEM AND METHOD FOR DETERMINING DRIVING FACTOR IN A DATA CUBE

(75) Inventors: Stewart James Winter, Ottawa (CA); Randy Mark Westman, Ottawa (CA); Murray John Reid, Ottawa (CA); Andrew Alexander Leikucs, Ottawa (CA); William Todd MacCulloch, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 11/881,149

(22) Filed: Jul. 25, 2007

(65) Prior Publication Data
US 2009/0030915 A1   Jan. 29, 2009

(51) Int. Cl.
*G06F 17/30* (2006.01)
*G06F 17/00* (2006.01)
(52) U.S. Cl. ......................... 707/776; 707/778
(58) Field of Classification Search .................. None
See application file for complete search history.

(56) References Cited

U.S. PATENT DOCUMENTS

| | | | | |
|---|---|---|---|---|
| 6,470,344 B1* | 10/2002 | Kothuri et al. | ........ | 707/100 |
| 6,609,123 B1* | 8/2003 | Cazemier et al. | ........ | 1/1 |
| 7,194,465 B1* | 3/2007 | MacGregor | ........ | 1/1 |
| 7,403,942 B1* | 7/2008 | Bayliss | ........ | 707/5 |
| 7,945,597 B2* | 5/2011 | Cras et al. | ........ | 707/803 |
| 7,966,322 B2* | 6/2011 | Clover | ........ | 707/728 |
| 7,979,362 B2* | 7/2011 | Zhao et al. | ........ | 706/11 |
| 2002/0091707 A1* | 7/2002 | Keller | ........ | 707/104.1 |
| 2003/0101176 A1* | 5/2003 | Kelkar | ........ | 707/6 |
| 2004/0122820 A1* | 6/2004 | Malloy et al. | ........ | 707/6 |
| 2005/0283488 A1* | 12/2005 | Colossi et al. | ........ | 707/100 |
| 2006/0190432 A1* | 8/2006 | Wang et al. | ........ | 707/3 |
| 2007/0143310 A1* | 6/2007 | Vigen | ........ | 707/100 |

FOREIGN PATENT DOCUMENTS
WO      0203326 A2    1/2002

OTHER PUBLICATIONS

P. S. Bradley Usama M. Fayyad O. L. Mangasarian Mathematical Programming for Data Mining: Formulations and Challenges, INFORMS Journal on Computing 11, 1999, 217-238.*

\* cited by examiner

*Primary Examiner* — Neveen Abel Jalil
*Assistant Examiner* — Polina Peach
(74) *Attorney, Agent, or Firm* — Shumaker & Sieffert, P.A.

(57) ABSTRACT

Method and system for determining a driving factor for a data value of interest in a multidimensional database, by collecting a context for the data value of interest in the multidimensional database. The data value of interest has dimensional levels with dimensional members outside the drill path of the data value of interest. The dimensional levels are enumerated in a list. A query using the dimensional members of the dimensional level is executed. A variance is calculated for the set of query results. A driving factor for the data value of interest is determined based on the variance. The driving factor is added to the context of the data value of interest.

8 Claims, 11 Drawing Sheets

|  |  | 1996 | 1997 | Years |
|---|---|---|---|---|
| Outdoor Products | Revenue | 451162.00 | 429291.00 | 880453.00 |
|  | Share | 45.71 | 33.58 | 38.87 |
| Environmental Line | Revenue | 397830.00 | 684754.00 | 1002594.00 |
|  | Share | 40.31 | 53.57 | 47.79 |
| Sport Line | Revenue | 137976.00 | 164240.00 | 302216.00 |

| Outdoor Products | 1997 | |
|---|---|---|
| Revenue | Country (0 - 176,981) ▼ | 1997 |
| Outdoor Products | Italy | 0 |
| | Hong Kong | 0 |
| | Singapore | 180 |
| | Mexico | 2,131 |
| | Sweden | 8,087 |
| | Belgium | 25,782 |
| | France | 25,964 |
| | Spain | 27,019 |
| | Japan | 27,978 |
| | Australia | 29,995 |
| | Germany | 31,236 |
| | United Kingdom | 35,833 |
| | Canada | 38,105 |
| | United States | 176,981 |

Figure 9 (a)

|   |   | ─ 912 |
|---|---|---|
| Outdoor Products | 1997 | United States |

| Revenue | Customer No (0 - 31,736) | 1997 |
|---|---|---|
| Outdoor Products | Wilderness Wonderment Ltd | 31,736 |
| | Trees to Seas Ltd | 29,813 |
| | Backwoods Equipment Pty | 27,432 |
| | 123 Fitness PTE Ltd | 17,636 |
| | Wally Mart | 17,606 |
| | Vacation Central | 15,480 |
| | OutBack Pty | 8,546 |
| | Over the Top Cycles | 7,878 |
| | Kay Mart | 6,096 |
| | Outdoor Central Ltd | 4,881 |
| | Supras Camping Supplies | 1,894 |
| | New Wave Wilderness | 1,676 |
| | Clear Valley Waters | 1,650 |
| | Rock Steady Inc. | 1,501 |
| | Bergsteiger G.m.b.H. | 1,294 |
| | Fredies Sport Whse | 1,059 |
| | Advanced Climbing Ltd | 638 |
| | Ultra Sports | 165 |
| | Florida Sun Sports | 0 |
| | Pro Form Supplies | 0 |
| | Act'N'Up Fitness | 0 |
| | Desert Duds & Tees | 0 |
| | GO Outlet | 0 |
| | Hill Street Sports | 0 |

Figure 9 (b)

| Outdoor Products | 1997 | United States | Wilderness Wonderment Ltd. — 922 |
|---|---|---|---|

| Revenue | Margin Range (0 - 9,814) | 1997 |
|---|---|---|
| Outdoor Products | Under 10% | 0 |
| | 10% - 20% | 0 |
| | Over 90% | 10 |
| | 80% - 90% | 205 |
| | 60% - 70% | 475 |
| | 30% - 40% | 603 |
| | 40% - 50% | 1,431 |
| | 20% - 30% | 2,345 |
| | 70% - 80% | 3,781 |
| | 50% - 60% | 9,814 |

SYSTEM AND METHOD FOR DETERMINING DRIVING FACTOR IN A DATA CUBE

FIELD OF THE INVENTION

The present invention relates to business intelligence data queries, more specifically, the present invention relates to a system and method for optimizing business intelligence data queries.

BACKGROUND OF THE INVENTION

Business decision makers often use business intelligence analytical software to pose operational performance questions as queries against their data sources. The basic capabilities of querying and reporting functions is extended by Online Analytical Processing (OLAP). OLAP provides a number of key benefits that enable users to make more efficient managerial and strategic decisions by providing a robust multidimensional understanding of the data from a variety of perspectives and hierarchies in a multidimensional database. Business decision makers who require access to large amounts of data in order to make their business decisions are able to use OLAP to manipulate data quickly and effectively.

Exemplary analytical and navigational activities provided by OLAP include:
- calculations and modeling applied across dimensions, through hierarchies and/or across members;
- trend analysis;
- slicing subsets;
- drill-down to deeper dimensional levels of consolidation;
- drill-through to other detail data; and
- pivot to new dimensional comparisons.

Other OLAP functionality that provides insights into business growth, spending, and sales patterns includes operations for ranking, moving averages, growth rates, statistical analysis, and "what if" scenarios.

Multidimensional databases intuitively view data as a multidimensional structural metaphor called a cube whose cells correspond to events that occurred in the business domain. Each event is quantified by a set of measures; each edge of the cube corresponds to a relevant dimension for analysis, typically associated to a hierarchy of attributes that further describe it. A multidimensional database may further comprise a collection of related cubes. Dimensions, such as an essential and distinguishing concept in multidimensional databases, are used for selecting and aggregating data at the desired level of detail.

Figure 1:
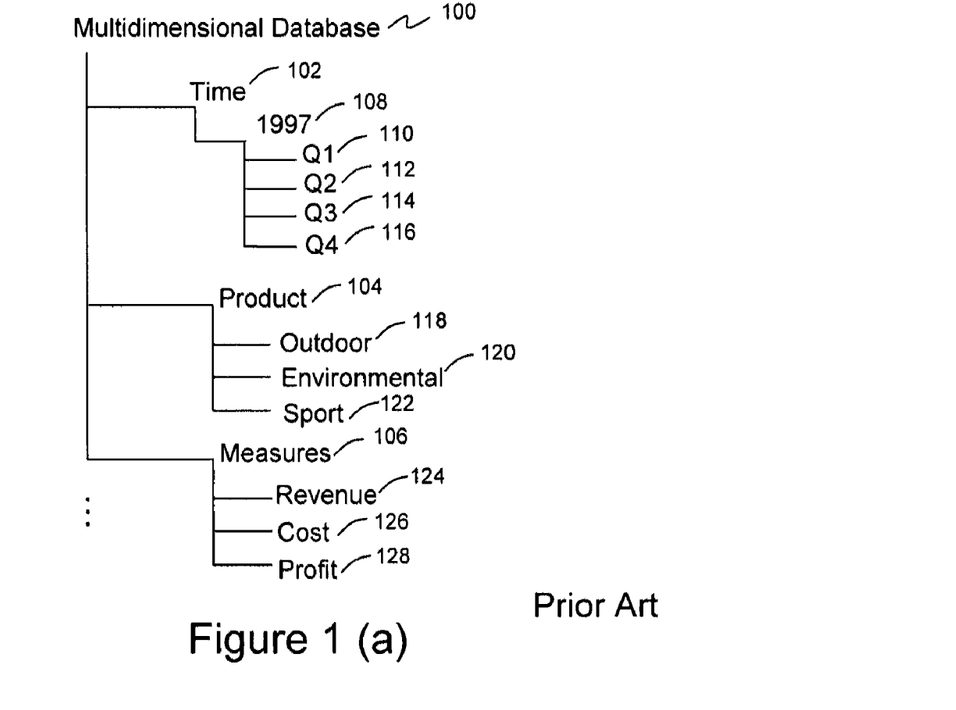
FIG. 1A depicts a diagram of the conceptual structure of a multidimensional database.
FIG. 1B depicts a diagram for the logical structure of a multidimensional cube.

FIG. 1(a) illustrates the conceptual structure of a multidimensional database 100. A dimension 102, 104, or 106 is a structural attribute that is a list of members, all of which are of a similar type in the user's perception of the data. For example, the year 1997 108 and all quarters, Q1 110, Q2 112, Q3 114, and Q4 116, are members of the Time dimension 102; the Outdoor 118, Environment 120 and Sport 122 are members of the Product dimension 104; and Revenue 124, Cost 126 and Profit 128 are members of the Measures dimension 106. Moreover, each dimension 102, 104, or 106 is considered a member of the multidimensional database 100.

FIG. 1(b) illustrates the logical structure of a multidimensional database 130 arranged as a multidimensional array, every data item in the multidimensional database 130 is located and accessed based on the intersection of the members of the dimensions 102, 104 and 106. The array comprises a group of data cells arranged by the dimensions 102, 104 and 106 of the data.

A dimension acts as an index for identifying values within the cube. If one member of the dimension is selected, then the remaining dimensions in which a range of members, or all members are selected defining a sub-cube in which the number of dimensions is reduced by one. If all but two dimensions have a single member selected, the remaining two dimensions define a slice or a page. If all dimensions have a single member selected, then a single cell is defined. Dimensions offer a very concise, intuitive way of organizing and selecting data for retrieval, exploration and analysis.

In the multidimensional database example 130 shown as a cube in FIG. 1(b), the dimensions are Time 102, Product 104, and Measures 106. The cube is three dimensional, with each dimension represented by an edge axis of the cube. The intersection of the dimension members are represented by cells in the multidimensional database that specify a precise intersection along all dimensions that uniquely identifies a single data point. For example, the intersection of Q4 116, Revenue 124 and Environmental 120 contains the value, 132, representing the revenue for environmental products in the fourth quarter of 1997.

Cubes generally have hierarchies or formula-based relationships of data within each dimension. Consolidation involves computing all of these data relationships for one or more dimensions. An example of consolidation is adding up all revenues in the first quarter. While such relationships are normally summations, any type of computational relationship or formula might be defined. In fact, there is no strict requirement to even have a relationship defined.

Members of a dimension are included in a calculation to produce a consolidated total for a parent member. Children may themselves be consolidated levels, which require that they in turn have children. A member may be a child for more than one parent, and a child's multiple parents may not necessarily be at the same hierarchical dimensional level, thereby allowing complex, multiple hierarchical aggregations within any dimension.

Drill-down (to show more detail), roll-up (to show less detail), pivot (to change axis dimensions) are currently available analytical techniques whereby the business decision maker navigates among dimensional levels of data ranging from the summarized to the detailed. The drilling paths may be defined by the hierarchies within dimensions or other relationships that may be dynamic within or between dimensions. For example, when viewing data for Revenue 124 for the year 1997 108 in FIG. 1(a), a drill-down operation in the Time dimension 102 would then display members Q1 110, Q2 112, Q3 114, and Q4 116.

Current business intelligence analytical software requires the business decision makers to explore OLAP cubes on their own. The exploration of data may be facilitated by a cross tabulation on a user interface.

When data value of interest, for example, data which is outside a predictable pattern or a typical range, has been discovered, the main course of action is to drill-down into more details to get a breakdown of how a value is constituted based on lower-level members in a multidimensional hierarchy. If there are no lower-level members to drill to, the business decision makers may have the option to "drill-through" to an alternate exploration instance that might provide more detail about how the data value of interest resulted from its constituent parts.

Drilling down to more details may provide some insight into which constituent members are contributing to the data value of interest, but may not pinpoint the causality in data values. Major influencers for the data value of interest could be on a specific data value in the context of a multidimensional cube, outside the drill path, i.e. not part of the dimensions making up the cross-tab, therefore the question of "why" is not answered completely.

In addition, many of the cells in a cube are interconnected by formulas. Cells representing profit, for example, are calculated by the difference between corresponding cells representing revenue and corresponding cells representing costs. Cells representing a year are computed as the sum of corresponding cells representing quarters. The drill-down and drill-through tasks typically require user experience. A user may have to experiment, using trial and error, with many possible data displays, before finding interesting exceptions. Therefore, the results of these data explorations may not be easily reproducible.

To explore manually all the data values in the context of a multidimensional cube outside the drill path is not practical. A multidimensional database may include many dimensions, each with a hierarchy of many dimensional levels, with each dimensional level including hundreds of member data elements, any one of them may be data with special interest.

There have been different approaches to identify the data with special values in a multidimensional database.

U.S. Pat. No. 7,065,534 uses curve fitting data techniques to provide detection of data anomalies in a "data tube" from a data perspective, if data substantially deviates from a predicted value established by a curve fitting process such as a linear function applied to the data tube. A threshold value can also be employed to facilitate in determining a degree of deviation necessary before a data value is considered anomalous.

U.S. Pat. No. 6,094,651 teaches a method for locating data anomalies in a dimensional data cube that includes the steps of associating a surprise value with each cell of a data cube, and indicating a data anomaly when the surprise value associated with a cell exceeds a predetermined exception threshold. The surprise value associated with each cell is a composite value that is based on at least one of a Self-Exp value for the cell, an In-Exp value for the cell and a Path-Exp value for the cell. This method is limited to the surprise value for the cells within the multidimensional cube in question and does not attempt to determine the levels indirectly involved in the contribution to the data value of interest.

U.S. Pat. No. 6,654,754 describes a method for interpreting, explaining, and manipulating selected exceptions in one or more dimensions in a multidimensional data by qualifying individual contributions for each dimension. A density threshold preset rule is assigned to each dimension. The density correction factor of the contribution is determined, before a density corrected contribution of each contribution based on the density correction factor and the density threshold preset rule is determined. The density-corrected contributions are normalized. Each dimension is then sorted according to the normalized, density corrected contributions associated with that dimension. This method of sorting dimensions is also limited to the dimensions within the multidimensional cube in question.

There is therefore a need to discover the causality of the discovered business intelligence beyond the proximity of the data value of interest.

There is a need to discover the causality of the discovered business intelligence outside the context of the multidimensional data being navigated.

There is further a need to discover the causality of the business intelligence with predictability and reproducibility, irrespective of the business decision maker's experience with the business intelligence application.

SUMMARY OF THE INVENTION

It is an object of the invention to provide an improved system and method for determining a driving factor influencing the data value of interest, the driving factor may be outside the multidimensional context of the data value of interest.

The invention according to an aspect of the invention provides a method for determining a driving factor for a data value of interest in a multidimensional database. A context collected for the data value of interest in the multidimensional database. The data value of interest has dimensional levels outside a drill path of the data value of interest. Each of the dimensional levels has dimensional members. The dimensional levels are enumerated in a list. A dimensional level is selected from the list. A query is executed using the dimensional members of the dimensional level resulting in a set of query results. A variance of the set of query results is calculated. A driving factor is determined for the data value of interest based on the variance.

Preferably, the driving factor is added to the context of the data value of interest.

Preferably, a query is executed for each of the plurality of dimensional levels in the list, and calculating a variance for each of the plurality of sets of query results.

Preferably, a subset of the list is used for executing a query step, and the list of dimensional levels is culled.

Preferably, the dimensional members for the driving factor are outputted.

Preferably, the dimensional members for the driving factor are outputted in a cross-tabulation.

Preferably, calculating a variance determines the minimum and maximum values of the set of data values resulting from the query.

Preferably, the method in accordance with one embodiment of the present invention further includes the steps of selecting a new data value of interest; removing levels involved with the new data value of interest from the list; determining a new driving factor; and adding the new driving factor to the context.

In accordance with another aspect of the present invention there is provided a business intelligence analysis system comprising a client and a server, the server responding to a query to a multidimensional database from the client, the system comprising: means for collecting a context for the data value of interest in the multidimensional database, the data value of interest having a plurality of dimensional levels outside a drill path of the data value of interest, each of the plurality of dimensional levels having dimensional members; means for enumerating the plurality of dimensional levels in a list; means for selecting a dimensional level from the list; means for executing a query using the dimensional members of the dimensional level resulting in a set of query results; means for calculating a variance of the set of query results; and means for determining a driving factor for the data value of interest based on the variance.

Preferably, the business intelligence analysis system further comprises means for adding the driving factor to the context of the data value of interest.

Preferably, the business intelligence analysis system further comprises means for executing a query for each of the plurality of dimensional levels in the list, and means for calculating a variance for each of the plurality of sets of query results.

In accordance with yet another aspect of the present invention there is provided a storage medium readable by a computer encoding a computer program for execution by the computer to carry out a method for determining a driving factor for a data value of interest in a multidimensional database, the computer program comprising: code means for means for collecting a context for the data value of interest in the multidimensional database; the data value of interest having a plurality of dimensional levels outside a drill path of the data value of interest; each of the plurality of dimensional levels having dimensional members; code means for enumerating the plurality of dimensional levels in a list; code means for selecting a dimensional level from the list; code means for executing a query using the dimensional members of the dimensional level resulting in a set of query results; code means for calculating a variance of the set of query results; and code means for determining a driving factor for the data value of interest based on the variance.

Preferably, the storage medium further comprises code means for adding the driving factor to the context of the data value of interest.

Preferably, the storage medium further comprises code means for executing a query for each of the plurality of dimensional levels in the list, and code means for calculating a variance for each of the plurality of sets of query results.

This summary of the invention does not necessarily describe all features of the invention.

BRIEF DESCRIPTION OF THE DRAWINGS

These and other features of the invention will become more apparent from the following description in which reference is made to the appended drawings wherein:

FIGS. 8(a) and (b) show the steps for determining a driving factor in accordance with one embodiment of the present invention;

FIGS. 9(a) (b) and (c) show a cross-tab having additional levels from a non-connected dimension.

DETAILED DESCRIPTION OF PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

The term "ancestor" is intended to describe a dimension value at any level above a particular value in a hierarchy. The ancestor value is the aggregated total of the values of its descendants. In the inheritance hierarchy of OLAP, an ancestor may also be an object that is two or more levels above a derived object.

The term "argument" is intended to describe a keyword, constant, or object name that provides input to a command, function, method, or program. An argument indicates the data values on which the command, function, method, or program operates; or specifies the operation of the command, function, method, or program.

The term "array" is intended to describe a group of data cells that are arranged by the dimensions of the data. A spreadsheet may be considered as a two-dimensional array in which the cells are arranged in rows and columns, with one dimension forming the rows and the other dimension forming the columns. Similarly, a three-dimensional array may be visualized as a cube with each dimension forming one edge of the cube.

An "attribute" is a descriptive characteristic of the elements of a dimension. Attributes represent logical groupings that allow users to select data based on like characteristics. For example, users might choose products using a Color attribute.

The term "cell" is intended to describe a data value identified by one value from each of the dimensions.

The term "child" is intended to describe a dimension value at the level immediately below a particular value in a hierarchy. Values of children are included in the calculation that produces the aggregated total for a parent. The dimension value may be a child for more than one parent if the dimension has more than one hierarchy. In the inheritance hierarchy of OLAP, a child may also be an object derived from another object.

The term "cube" is intended to describe a logical organization of multidimensional data. The edges of a cube typically contain dimension values, and the body of a cube contains measure values.

The term "data space" is intended to describe a space into which the data items can be mapped. In general, a number of bodies of data can be mapped into the same data space.

The term "descendant" is intended to describe a dimension value at any level below a particular value in a hierarchy. Values of descendants are included in the calculation that produces the aggregated total for an ancestor. In the inheritance hierarchy of OLAP, descendants may also be an object of two or more levels below another object, the ancestor.

The term "edge" is intended to describe one side of a crosstab. Each edge contains values from one or more dimensions. Data organized for display purposes along three edges are referred to as the row edge, column edge, and page edge.

The term "fact" is intended to describe a focus of interest for the decision-making process; fact typically models a set of events occurring in the enterprise world.

The term "hierarchy" is intended to describe a directed tree, rooted in a dimension, whose nodes are all the dimension tributes that describe that dimension, and whose arcs model many-to-one associations between pairs of dimension attributes. A hierarchy is a logical structure that uses ordered levels as a means of organizing and structuring dimension elements in parent-child relationships, with each level representing the aggregated total of the data from the level below.

The term "level" is intended to describe a position in a dimension hierarchy. Each level above the base level represents the aggregated total of the data from the level below. A level has constituent members. For example, a time dimension might have a hierarchy that represents data at the day, month, quarter, and year levels with 29, February, Q1 and 2000 as exemplary members.

The term "query" is intended to describe a specification for a particular set of data, the particular set of data is referred to as the query's result set. The specification may include intrinsic manipulation such as selecting, aggregating, calculating, or otherwise manipulating data.

The term "report" is intended to describe a tabular presentation of multidimensional data. A report may be considered as an analysis tool that is used to view, manipulate, and print data.

The term "slice" is intended to describe a subset of multidimensional data.

Figure 2:
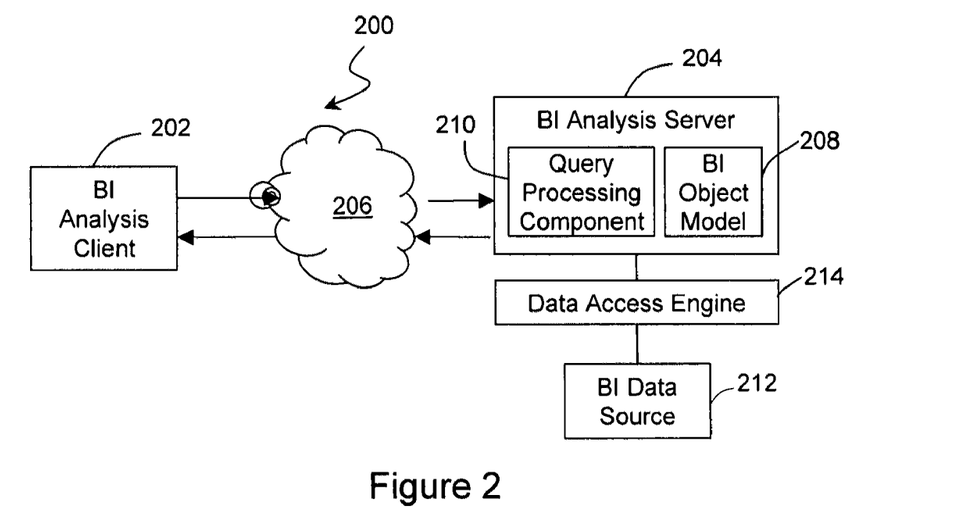
FIG. 2 is a block diagram showing a client-server architecture which performs business intelligence analysis.

FIG. 2 provides an overview of a business intelligence analysis client system 200 in accordance with an embodiment of the invention.

The business intelligence analysis client 202 communicates with a business intelligence analysis server 204 over a computer network 206, such as the Internet, an intranet and/or an extranet. The analysis server 204 has a business intelligence object model 208 and a query processing component 210. The object model 208 represents one or more underlying business intelligence data sources 212 storing business intelligence data. The query processing component 210 processes queries received from the analysis client 202 and retrieves requested data from the data sources 212 through the data access engine 214, using the object model 208.

Figure 3:
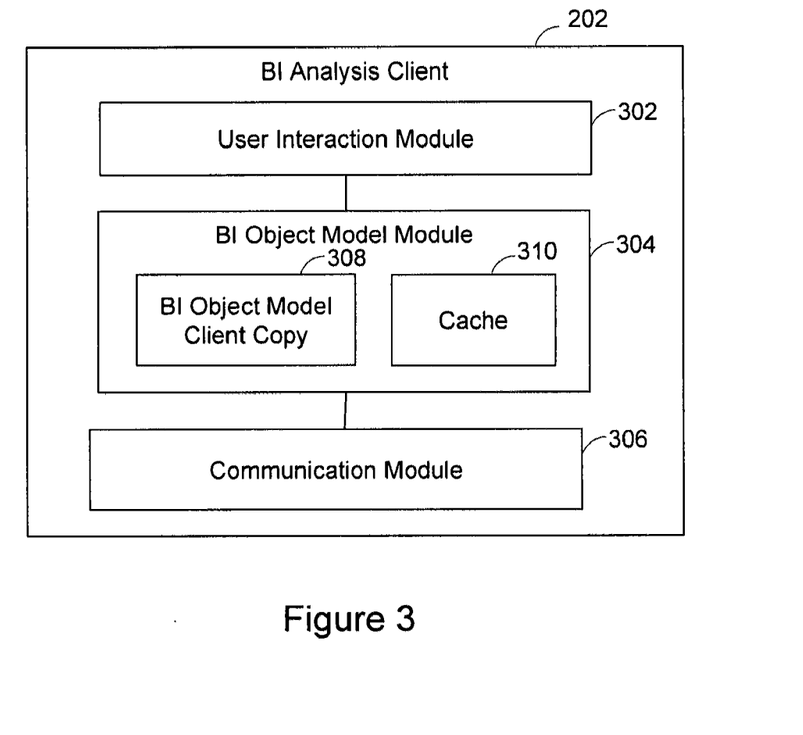
FIG. 3 is a block diagram showing an embodiment of a business intelligence analysis client.

As shown in FIG. 3, the analysis client system 202 has a user interaction module 302, a business intelligence object model module 304 and a communication module 306.

The user interaction module 302 manages user gestures through user interfaces, and converts the user gestures to requests comprising discreet commands for the object model module 304. For example, user gestures may include selecting, expanding or nesting data in a cross-tab. The user interaction module 302 also manages the rendering of the business intelligence objects for displaying responses to the user gestures.

The user interaction module 302 typically displays only a portion of the data available within the object model module 304, and may maintain a small copy of this data decorated to support efficient user interface activity.

The object model module 304 has a client copy 308 of the object model 208 of the analysis server 204. The object model client copy 308 stores model objects, which share a common definition with the analysis server 204. The analysis server 204 issues to the analysis client 202 commands to create, delete, replace or update objects in the object model client copy 308. For example, the analysis client 202 requests high level actions of the analysis server 204, such as drilling, expanding or nesting of data, and the analysis server 204 responds with object definitions and commands to modify the objects in the object model client copy 308. Thus, the analysis client 202 and analysis server 204 share a common business intelligence object model. When a driving factor is determined and added to the dimensional context of the data value of interest, in accordance with the embodiments of the present invention, the modified dimensional context may be stored in the client copy of the model.

The object model module 304 may also manage a cache 310 of objects. It may perform intelligent look-ahead behavior.

The communications module 306 manages requests issued to, and responses received from the analysis server 204. The communications module 306 parses responses and directs them to the appropriate objects in the object model client copy 308.

Figure 4:
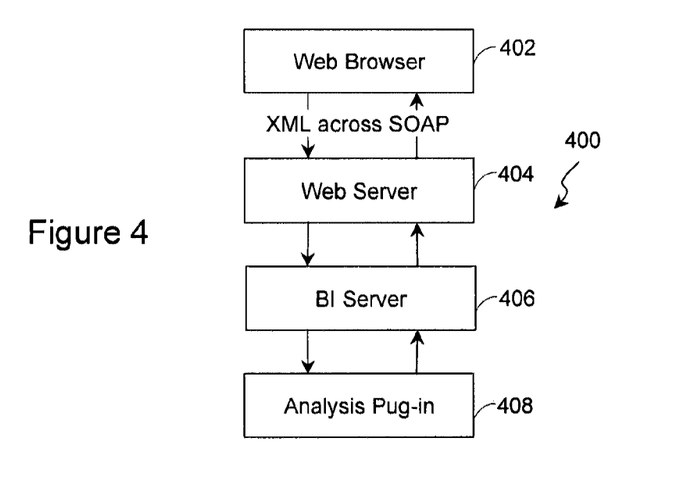
FIG. 4 is a block diagram showing an exemplary business intelligence analysis client-server system.
Figure 5:
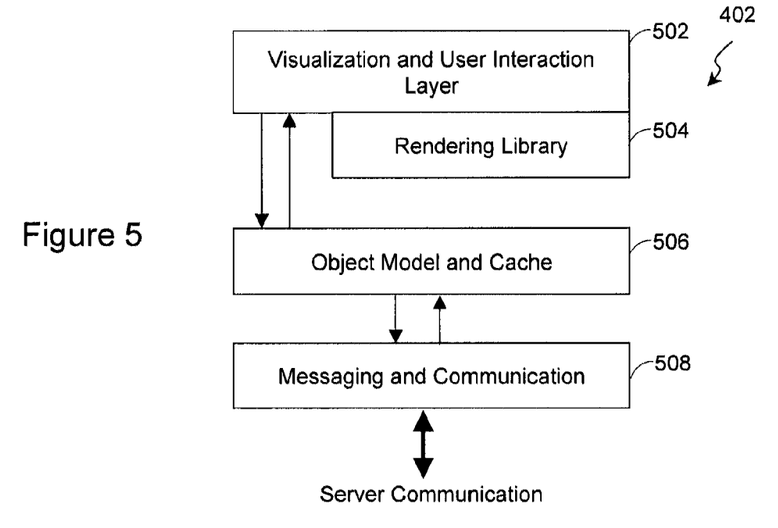
FIG. 5 is a block diagram showing the architecture of the Web browser based client in FIG. 6(a) depicts a cross-tabulation.

Referring to FIGS. 4 and 5, an exemplary business intelligence analysis client-server system 400 using a Web browser 402 is described. In this embodiment, the analysis client 402 is Web browser based. The Web browser based client 402 communicates to a Web server 404, which communicates with a business intelligence server 406 over a computer network, such as the Internet, an intranet and/or extranet. The business intelligence server 406 has an analysis plug-in 408 for updating the server copy of the business intelligence object model, processing queries, retrieving data and preparing commands to update the client copy of the common business intelligence object model.

FIG. 5 shows the architecture of the Web browser based client 402. The browser client 402 has a visualization and user interaction module or layer 502, an object model and cache module or layer 506 and a messaging and communication module or layer 508. These layers may provide similar functions as the user interaction module 302, business intelligence object model module 304 and communication module 306 shown in FIG. 3, respectively.

The visualization layer 502 has a rendering library 504 containing rendering elements, such as, menus, toolboxes, and cross-tabulation (cross-tabs).

The browser based client 402 may be written in javascript. The client-server interactions may use Extensible Markup Language (XML). The visualization of objects in the client may use Dynamic HTML (DHTML). The object model and cache layer 506 stores and manages the classes of objects, such as DataMatrix, MetadataSet, and FilterSet, which share a common definition with the business intelligence server 406.

The communications layer 508 manages Simple Object Access Protocol (SOAP) requests issued to and received from the business intelligence server analysis plug-in 408 via the Web server 404.

An example of the process flow between the components of the Web browser based client 402 and the business intelligence server 406 and analysis plug-in 408 is now described.

The visualization and user interaction layer 502 of the browser client 402 captures the user gestures. These gestures are converted to function calls into the object model layer 506.

The object model layer 506 then takes the function call and converts this to a business intelligence request to the web server 404. This request is formulated as an XML document and handed to the communication layer 508.

The communication layer 508 takes the XML document, wraps this into a SOAP request package, and then issues an Hyper Text Transfer Protocol (HTTP) request to the Web server 404 with this SOAP package. The communication layer 508 asynchronously monitors the progress of the request.

The Web server 404 sends the HTTP request to the business intelligence server 406 through the computer network.

The business intelligence server 406 receives the request and hands it to the analysis plug-in 408. The analysis plug-in 408 processes the request, queries the database as required, and creates an XML document containing the response. The XML document result describes updates to the common object model that is shared between the browser client 402 and the business intelligence server 406.

The communication layer 508 of the browser client 402 receives the HTTP response containing the SOAP response which includes the XML document describing the updates to the model in the object model layer 506. The communication layer 508 hands the XML document to the object model layer 506.

The object model layer 506 processes the XML response and updates the client or local copy of the model in the object model layer 506 with the changes identified by the business intelligence server analysis plug-in 408. The object model layer 506 notifies the visualization layer 502 about the changes to the objects of the model in the object model layer 506. The visualization layer 502 then completes the request pending state, and retrieves the new information from the object layer 506 and then updates the display, e.g., a tree and cross-tab, with the new information retrieved from the server as stored in the object layer 506 of the browser client 402.

The browser client 402 and the business intelligence server 406 are based on a client-server application program interface (API). The client-server API reflects well-defined separation of responsibilities between the browser client 402 and the business intelligence server 406. The API comprises a set of XML requests from the browser client 402 to the business intelligence server 406. In addition, there is a set of responses returned from the business intelligence server 406 to the browser client 402.

When analyzing data in a multidimensional database, a business decision maker typically wants to identify anomalies, or exceptions in the data, because such exceptions can provide interesting information. For example and referring to FIG. 1(b), revenue 124 of sport product 122, might peak in a particular quarter of the year. Identifying such a data value of interest can provide the business decision maker with useful insights on how to improve marketing, etc.

Figure 6:
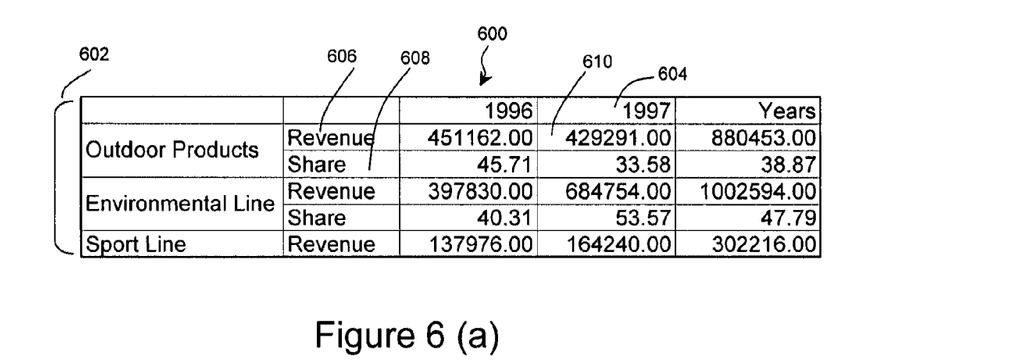
FIG. 6(b) shows a multidimensional database with participating and non-participating dimensions.

Referring to FIG. 6(a), a cross-tab 600 comprising Products 602 on rows and children of Years on columns 604 is shown, where two measures, Revenue 606 and Share 608 are nested within Products on rows. The cross-join of Products 602, Revenue 606, Share 608 and Year 604 form the context of the cross-tab 600. The cell 610 in the cross-tab is assumed to include data value of interest, for example, data which is outside a predictable pattern or a typical range. The context of cell 610 is the intersection of the Year 1997, Products 602 and Revenue 606.

FIG. 6(b) shows a multidimensional database 612 with m+k dimensions. The k dimensions 614 participate in the context of the cross-tab 600. The k participating dimensions 614 have $l_1+l_2, +l_3, \ldots, +l_k$ dimensional levels, where $l_1+l_2, +l_3, \ldots, +l_k$ are the numbers of the dimensional levels for the respective dimensions $1, 2, 3, \ldots, k$.

Accordingly, the multidimensional database 612 has m dimensions 616 which are not directly connected to the participating dimensions 614. The m participating dimensions 616 have $n_1+n_2, +n_3, \ldots, +n_m$ dimensional levels, where $n_1+n_2, +n_3, \ldots, +n_m$ are the numbers of the dimensional levels for the respective dimensions $1, 2, 3, \ldots, m$.

Figure 7:
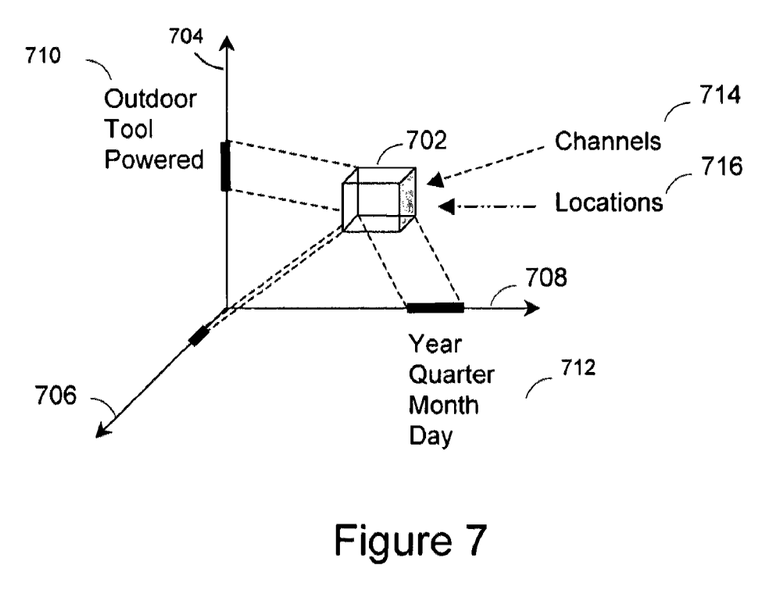
FIG. 7 shows a data value of interest in the context of a multidimensional database.

Further referring to FIG. 7, a data value of interest 702, for example, data which is outside a predictable pattern or a typical range, is identified, which has three participating dimensions: Product 704, Measures 706 and Time 708. The Product dimension 704 may have three dimensional levels 710; while the Time dimension 708 may have four dimensional levels: year, quarter, month, and day 712. A standard drill-down operation explores the details of these dimensional levels. However, as illustrated in FIG. 7, other dimensions, for example the Channels dimension 714 or the Locations dimension 716 may have data which also influence the data value of interest 702, but are not connected to the participating dimension by the current view. The term "driving factor" is intended to describe data which have higher influence on the data value of interest 702, compared to the remainder in the multidimensional data. The term "non-connected" or the term "non-participating" is intended to include the dimensional levels in a dimension which are not on the drill paths of a data value of interest. In other words, for each non-connected dimension, the user has not specified which member should contribute to the data value of interest 702.

Figure 8:
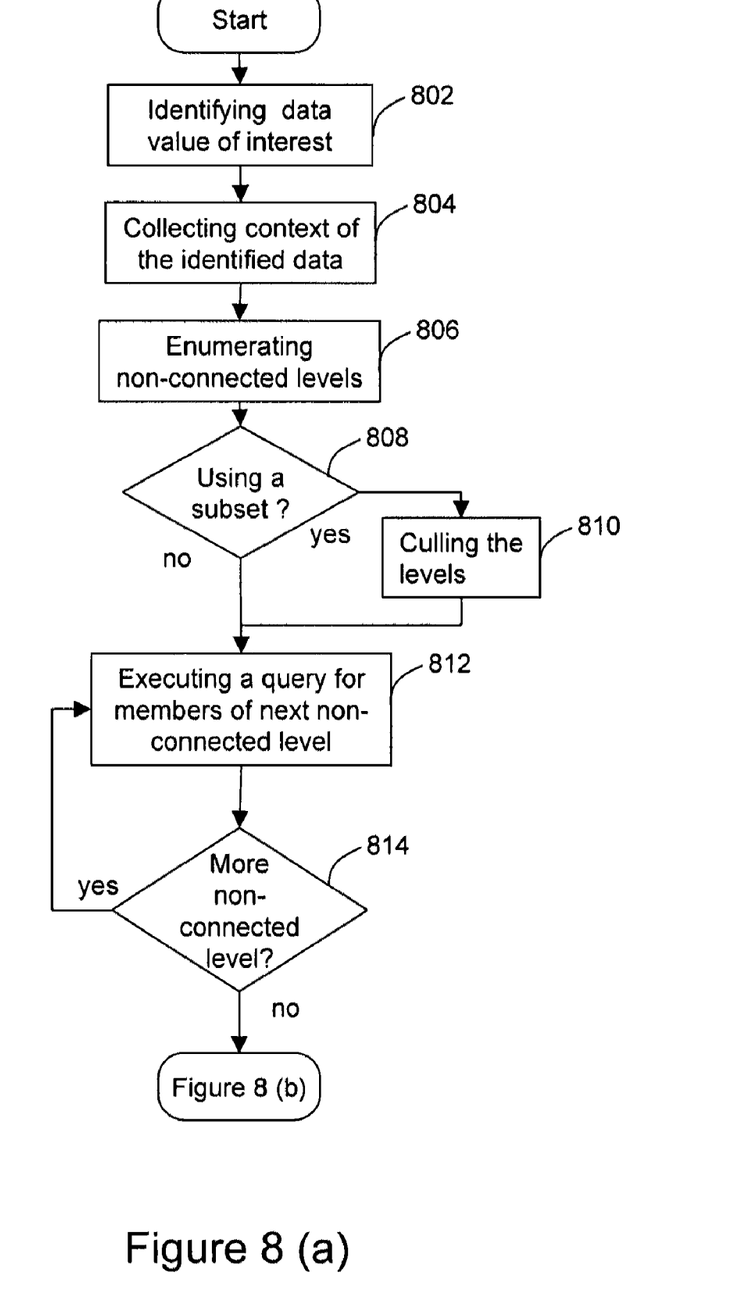

Referring to FIGS. 7 and 8, in accordance with one embodiment of the present invention, data value of interest 702 is first identified 802 in a multidimensional data cube. The context for the data value of interest 702 is then collected 804. In the example in FIG. 7, the context is the intersection of Product 704, Measures 706, and Time 708.

All dimensional levels in the data cube that are not directly associated with the context of the data with specifics value 702 are enumerated 806. The members of the non-connected dimensional level for execution may be a selected subset 808 of the members, in this case, the levels of the non-connected levels will be reduced 810. This reduction of non-participating dimensional levels can be performed by pruning the list of the available non-participating dimensions, or for more granularity within an individual non-participating dimension, by specifying to what depth from the root level of the non-participating dimension its levels should be evaluated. Alternatively, all members of the non-connected dimensional level will be used.

A query is then executed using the members of a non-connected dimensional level 808, resulting in a set of query results for the data value of interest.

The query will be executed 812 for each non-connected dimensional level 814 in the enumerated list. A variance calculation, for example, the determination of the difference between the minimum and the maximum values of the set of data values resulting from the query using the members of the non-connected dimensional level, will be performed 816. In other words, the variance between the members of the non-connecting dimensional level resulting from the query in the context of the data value of interest in the original cross-tab will be determined.

Once the variances of all the enumerated levels have been computed, the level with the greatest variance is a candidate for having significance to, i.e. a candidate for a driving factor for, the data value of interest. If the variance is noticeably greater, for example, the difference between the minimum and maximum level-member values is noticeably higher for one level compared to the others in the enumerated list, then there is a higher probability that this level has a greater impact on the data value of interest. In other words, the level with the noticeably greater variance is likely a driving factor. It may be desirable to further investigate this level in the context of the data value of interest 818.

Figure 9:
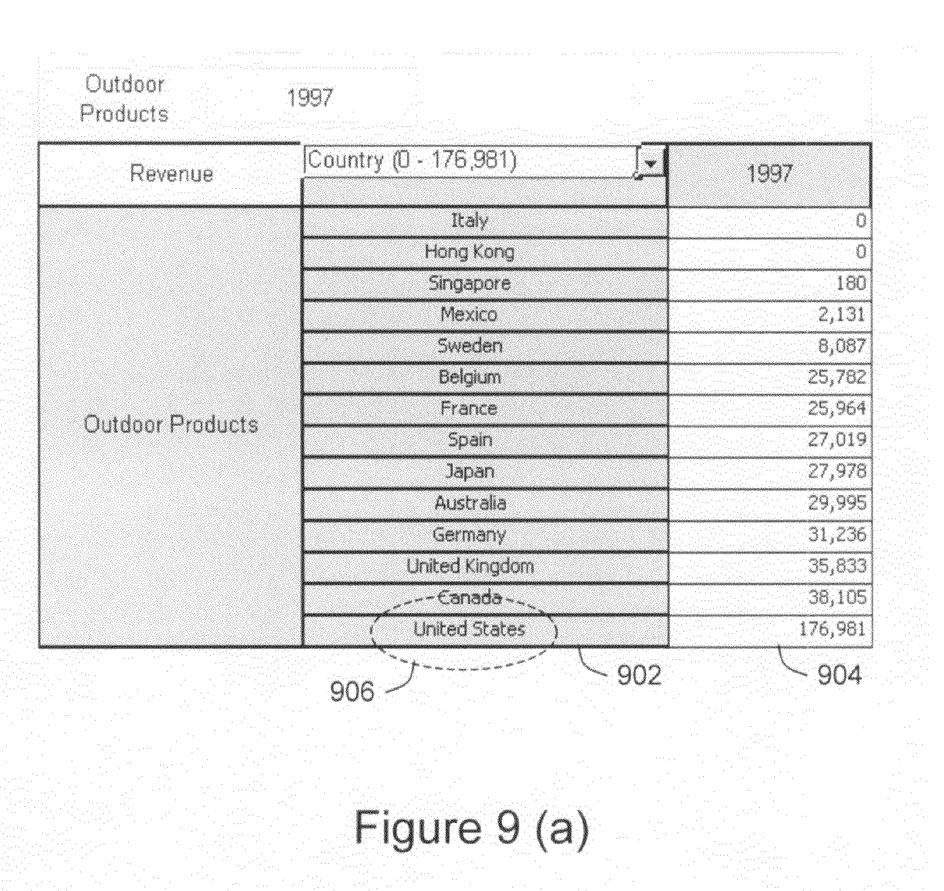

Referring to FIGS. 7, 8 and 9(a), a non-limiting example is to execute a query using members of the Location dimension 716, 902: Italy, Singapore, Mexico . . . etc. The query results in a set of results with different values for the Revenue in the data 702, 904.

United States 906 is selected due to its high value compared to other countries. Driving factors algorithm as described is applied. Also referring to FIG. 9(b), United States is added to the context boxes at the top of the crosstab 912. The new level "Customer No" 914 with the highest variance based on the driving factors algorithm as described is displayed as the first choice of levels in the drop-down list.

Figure 10:
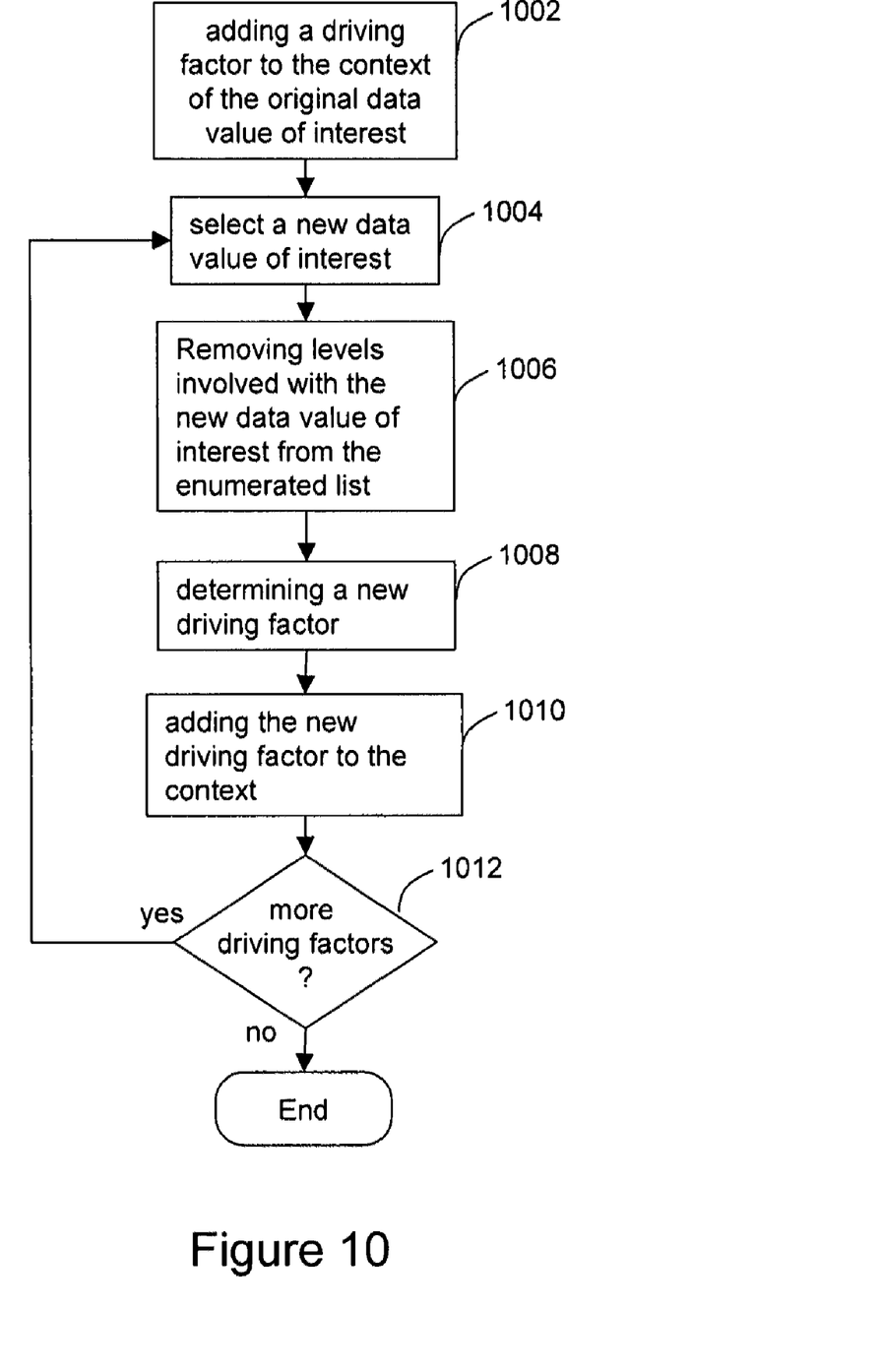
FIG. 10 shows the steps of determining additional driving factors.

Further referring to FIG. 10, the process of determining a driving factor can be re-iterated. In the example in FIGS. 9(a) and (b), the values for all the members of the "Customer No" level are displayed so that a member from that level can be selected to add to the context, and the process can be repeated.

After adding a driving factor to the context of the original data value of interest 1002, a new data value or a set of new data values of interest may be selected 1004, in the example in FIGS. 9(a) and (b), the new level "Customer No" 914. When a new data value is selected, the levels directly involved with the new data value of interest is removed from the enumerated list 1006.

A member from the "Customer No" level can be chosen to add to the context 1010, or a different level can be selected, and a different member used accordingly. In this example, the member "Wilderness Wonderment Ltd." 918 will be chosen due to its high value.

Referring to FIG. 9(c), the member "Wilderness Wonderment Ltd." 922 is added to the context, and the driving factors algorithm is repeated 1008. The level "Margin Range" 924 is added 1010 and displayed after this round of execution for the driving factors algorithm. This process will continue 1012 until the user is satisfied with the results of the analysis.

The list of levels may be presented or outputted to the business decision maker with an indication as to which level has the highest probability of affecting the data value of interest 820. The driving factor will be added to the context of the original data value of interest 824 if the driving factor is of interest 822.

All levels from the new data value, which have a new context because of the addition of the driving factor to the original context, are removed from the list of enumerated levels 1006. The driving factor algorithm is re-executed with the new information 1008. Each time a new data value is analyzed, and a new driving factor is determined 1008, the new driving factor is added to the existing dimensional context 1010. This process can be repeated until the scope of the analysis is sufficiently narrowed and the relevant data is sufficiently focused.

An exemplary implementation of the above embodiment may be partially expressed in the following pseudo-code:

```
var valueIntersect = selectDataValueIntersection( );
array context = collectContext(valueIntersect) {
    context = collectRowIntersectionMembers( )
    context += collectColumnIntersectionMembers( )
    context += collectSlicerEntries( )
    return context
}
array contextHierarchyList =
getHierarchiesFromContext(context)
array hierarchies = collectAllHierarchies( );
for(each hierarchy in hierarchies ) {
    if hierarchy is in contextHierarchyList
```

```
        do nothing
    else
        add to finalHierarchyList
}
array finalLevelList;
for(each hierarchy in finalHierarchyList) {
    array levels = getAllLevelsInHierarchy( );
    for(each level in levels) {
        count++
        if( count < maxLevelCount ) {
            add to finalLevelList
        }
    }
}
for(each level in finalLevelList)
    execute query to retrieve min and max values based on
current context
    calculate variance
}
sort finalLevelList according to variance
display finalLevelList /*level with greatest variance has
all members of level displayed*/
level = chooseLevel( ) /*chosen level now has all members
displayed*/
member = chooseMemberFromLevel
addChosenMemberToContext(member,context);
repeat process until done
```

Embodiments within the scope of the present invention can be implemented in digital electronic circuitry, or in computer hardware, firmware, software, or in combinations thereof. Apparatus within the scope of the present invention can be implemented in a computer program product tangibly embodied in a machine-readable storage device for execution by a programmable processor; and method actions within the scope of the present invention can be performed by a programmable processor executing a program of instructions to perform functions of the invention by operating on input data and generating output. Embodiments within the scope of the present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present invention include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present invention have been shown and described, changes and modifications may be made to such embodiments without departing from the true scope of the invention.

The present invention has been described with regard to one or more embodiments. However, it will be apparent to persons skilled in the art that a number of variations and modifications can be made without departing from the scope of the invention as defined in the claims.

What is claimed is:

1. A method for determining a driving factor for a data value of interest in a multidimensional database, the method comprising:
    collecting a context for the data value of interest in the multidimensional database, wherein the data value of interest having a first plurality of dimensions and a drill path, wherein the context comprises an intersection of the first plurality of dimensions, wherein the drill path comprises a first plurality of dimensional levels connected to the first plurality of dimensions, wherein a second plurality of dimensions not directly connected to the first plurality of dimensions comprises dimensions outside the context and outside the drill path, wherein a second plurality of dimensional levels comprise dimensional levels connected to the second plurality of dimensions, the first and the second pluralities of dimensional levels each having dimensional members;
    applying the context of the data value of interest to each of the second plurality of dimensional levels to generate a query for each of the second plurality of dimensional levels, wherein, for each of the second plurality of dimensional levels, the query for that dimensional level, when executed, queries the intersection of
    1) the first plurality of dimensions, and
    2) each of the dimensional members of that dimensional level;
    executing, by one or more computing devices, the query for each of the second plurality of dimensional levels using the dimensional members of each of the second plurality of dimensional levels to generate a set of data values for each of the second plurality of dimensional levels, wherein each data value of the set of data values is calculated by at least applying a value of one of the dimensional members of one dimensional level of the second plurality of dimensional levels to the data value of interest, wherein a subset of the second plurality of dimensional levels outside the context and the drill path is used for executing the query;
    calculating a variance of the set of data values generated for each dimensional level of the second plurality of dimensional levels;
    identifying one of the dimensional levels of the second plurality of dimensional levels as having a greatest variance of the calculated variances;
    selecting the identified dimensional level as the driving factor;
    generating a new data value of interest having a new context that comprises an intersection of the first plurality of dimensions and a dimension of the driving factor;
    selecting the new data value of interest;
    removing levels involved with the new data value of interest from the second plurality of dimensional levels;
    determining a new driving factor; and
    adding the new driving factor to the context.

2. The method of claim 1, further comprising outputting dimensional members for the driving factor in a cross-tabulation.

3. The method of claim 1, wherein calculating a variance determines the minimum and maximum values of the set of data values resulting from the query.

4. A computer-readable storage device comprising instructions for causing one or more programmable processors to determine a driving factor for a data value of interest in a multidimensional database, wherein the instructions to determine the driving factor further comprise instructions for causing the one or more programmable processors to:
    collect a context for the data value of interest in the multidimensional database, wherein the data value of interest having a first plurality of dimensions and a drill path, wherein the context comprises an intersection of the first plurality of dimensions, wherein the drill path comprises a first plurality of dimensional levels connected to the first plurality of dimensions, wherein a second plurality of dimensions not directly connected to the first plurality of dimensions comprises dimensions outside the context and outside the drill path, and wherein a second plurality of dimensional levels comprise dimensional levels connected to the second plurality of dimensions, the first and the second pluralities of dimensional levels each having dimensional members;
    apply the context of the data value of interest to each of the second plurality of dimensional levels to generate a query for each of the second plurality of dimensional levels, wherein, for each of the second plurality of dimensional levels, the query for that dimensional level, when executed, queries the intersection of
    1) the first plurality of dimensions, and
    2) each of the dimensional members of that dimensional level;
    execute a query for each of the second plurality of dimensional levels using the dimensional members of each of the second plurality of dimensional levels to generate in a set of data values for each of the second plurality of dimensional levels, wherein each data value of the set of data values is calculated by at least applying a value of one of the dimensional members of one dimensional level of the second plurality of dimensional levels to the data value of interest, wherein a subset of the second plurality of dimensional levels outside the context and the drill path is used for the execution of the query;
    calculate a variance of the set of data values generated for each dimensional level of the second plurality of dimensional levels;
    identify one of the dimensional levels of the second plurality of dimensional levels as having a greatest variance of the calculated variances;
    select the identified dimensional level as the driving factor;
    generate a new data value of interest having a new context that comprises an intersection of the first plurality of dimensions and a dimension of the driving factor;
    select the new data value of interest;
    remove levels involved with the new data value of interest from the second plurality of dimensional levels;
    determine a new driving factor; and
    add the new driving factor to the context.

5. A system for determining a driving factor for a data value of interest in a multidimensional database, the system comprising:
    a business intelligence analysis server device, wherein the business intelligence analysis server device is configured to:
        collect a context for the data value of interest in the multidimensional database, the data value of interest having a first plurality of dimensions and a drill path, wherein the context comprises an intersection of the first plurality of dimensions, wherein the drill path comprises a first plurality of dimensional levels connected to the first plurality of dimensions, wherein a second plurality of dimensions not directly connected to the first plurality of dimensions comprises dimensions outside the context and outside the drill path, and wherein a second plurality of dimensional levels comprise dimensional levels connected to the second plurality of dimensions, the first and the second pluralities of dimensional levels each having dimensional members;

apply the context of the data value of interest to each of the second plurality of dimensional levels to generate a query for each of the second plurality of dimensional levels, wherein, for each of the second plurality of dimensional levels, the query for that dimensional level, when executed, queries the intersection of
1) the first plurality of dimensions, and
2) each of the dimensional members of that dimensional level;

execute, by one or more computing devices, a query for each of the second plurality of dimensional levels using the dimensional members of each of the second plurality of dimensional levels resulting in a set of data values for each of the second plurality of dimensional levels, wherein each data value of the set of data values is calculated by at least applying a value of one of the dimensional members of one dimensional level of the second plurality of dimensional levels to the data value of interest, wherein a subset of the second plurality of dimensional levels outside the context and the drill path is used for the execution of the query;

calculate a variance of the set of data values generated for each dimensional level of the second plurality of dimensional levels;

identify one of the dimensional levels of the second plurality of dimensional levels as having a greatest variance of the calculated variances;

select the identified dimensional level as the driving factor;

generate a new data value of interest having a new context that comprises an intersection of the first plurality of dimensions and a dimension of the driving factor;

select the new data value of interest;

remove levels involved with the new data value of interest from the second plurality of dimensional levels;

determine a new driving factor; and add the new driving factor to the context.

6. The method of claim 1, further comprising enumerating the second plurality of dimensional levels outside the context and outside the drill path in a list.

7. The computer-readable storage medium of claim 4, further comprising instructions for causing the one or more programmable processors to enumerate the second plurality of dimensional levels outside the context and outside the drill path in a list.

8. The system of claim 5, wherein the business intelligence server device is further configured to enumerate the second plurality of dimensional levels outside the context and outside the drill path in a list.

* * * * *